Feb. 19, 1946. C. A. SOUTHWICK, JR 2,395,077
SHEET MATERIAL AND SEAM CONSTRUCTION
Filed May 3, 1943
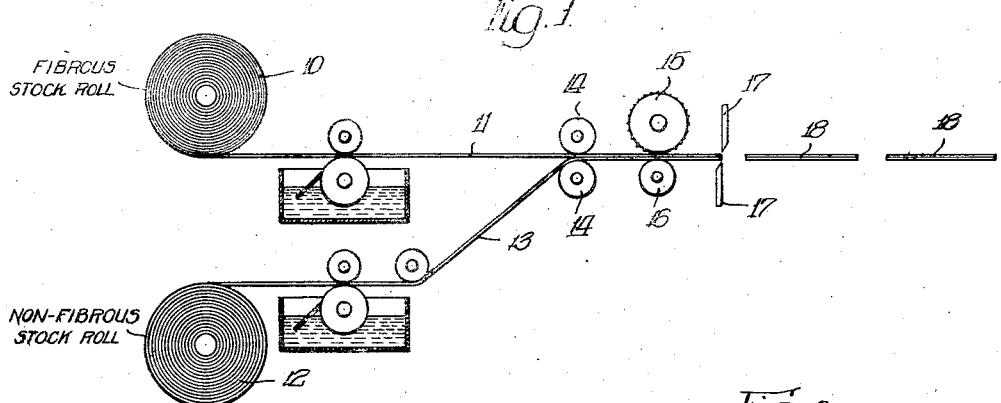
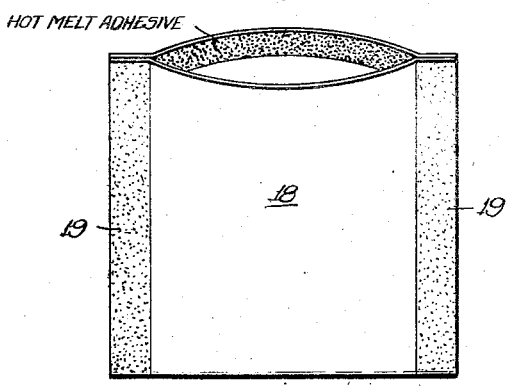
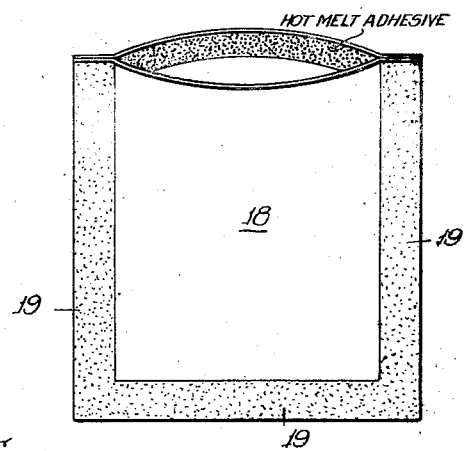
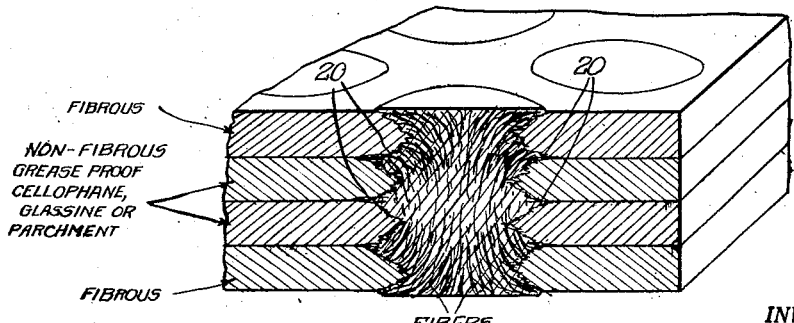
INVENTOR.
Charles A. Southwick Jr.
BY
Cromwell, Greist & Warden
attys.

Patented Feb. 19, 1946

2,395,077

UNITED STATES PATENT OFFICE 2,395,077

SHEET MATERIAL AND SEAM CONSTRUCTION

Charles A. Southwick, Jr., Mount Vernon, Ohio, assignor to Shellmar Products Company, Mount Vernon, Ohio, a corporation of Delaware Application May 3, 1943, Serial No. 485,432

2 Claims. (Cl. 93—35)

This invention relates to improvements in the manufacture of sheet material. More particularly, it pertains to an improved type of sheet wrapping material for conversion into articles which will provide a novel type of reinforced seam and seal construction possessing correlated improvements and discoveries whereby the utility of the ultimate articles are considerably enhanced.

Articles such as those contemplated by the present invention have heretofore been made with seam constructions in quite a different manner and with different structural characteristics than those embodied by the present invention. For example, exceptionally large bags or wraps, particularly those utilizing multi-ply or laminated constructions, are required to have considerable strength throughout their seam areas. Such seams are easily de-laminated because the adhesive material itself offers insufficient anchorage between structural layers of the seam. In order to overcome this defect it is necessary either to staple or sew the seams together after sealing. The chief difficulty and disadvantage of such seams is their lack of water and moisture-proof characteristics because of the perforations resulting from the stitching or stapling operation. Also, the manufacture of such bags necessitates special and complicated mechanisms and operating procedures and is otherwise expensive.

Generally, therefore, it is an object of the present invention to provide sheet material to be converted into wrapping material, bags, containers, or the like, with a seam and seal construction which will result in an article which is economic of manufacture, sturdy and durable of construction, and which otherwise will overcome the disadvantages and difficulties above set forth in connection with conventional types of construction.

A principal object of the invention is to provide sheet material for producing a reinforced seam and seal construction in which the seam areas have been pierced to provide numerous openings so that a suitable type of adhesive in this area, responsive to heat and pressure, is dispersed throughout the perforations and adjacently between laminations including the seams in a manner which will provide an anchorage for all the seam layers and result in an interlocked seal construction.

Another object of the invention is to provide a sheeting material for a finished article having a seam which is a welded mass.

A further object of the invention is to provide a seam and seal construction for such articles wherein blanks of sheet material receive individual as well as mutual anchorages between laminated areas in the seam structure.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a diagrammatic representation of a preferred method of providing laminated sheets and blanks therefrom having predetermined applications of adhesive with corresponding perforated areas providing adhesive clinching anchorages;

Figs. 2 and 3 are perspective views illustrating two simple forms of articles, or bags, formed from blanks shown in Fig. 1; and Fig. 4 is an exaggerated fragmentary perspective portion illustrating a laminated seam and seal structure of a seamed article such as those shown in Figs. 2 and 3.

Referring more particularly to the drawing, there is illustrated, for example, in Fig. 1 a stock roll 10 of kraft paper or other suitable fibrous reinforcing material passing between applicator and pressure rollers of a gravure press. The applicator roller transfers to the under side of web 11 coming off the roll 10 an overall layer of laminating adhesive. A stock roll 12 provides a web of material, preferably non-fibrous, such as Cellophane, glassine, parchment or the like. This passes between an etched gravure cylinder and pressure roll which applies predetermined layers of a suitable type of adhesive marginally as well as transversely or in any other suitable design. This adhesive preferably is of a hot-melt variety, or a micro-crystalline wax, or may be any other suitable thermosetting or thermoplastic adhesive. It can also be a pressure sensitive adhesive. The entire roll 12 may comprise, in whole or in part, rubber hydrochloride. In the latter case, of course, no adhesive application would be used. After passing through the last named applicator the resulting web 13 is laminated to the web 11 between pressure rolls 14, 14. The laminated web then can be passed between a perforating roller 15 and counter roller 16, the former piercing the laminated sheet at predetermined points through the design applied to the web 13. It is important that the perforations are not a punching operation so as to effect the removal of material all the way through the lamina but are to be brought about by sharp needle-like punctures in such a manner as to disrupt and fringe the fibrous structure and expose the fibrous tentacles of the material. Suitable cutting means as, for example, knives 17, 17 are disposed in a convenient position to sever the laminated sheet into blanks 18, 18.

It will be understood, of course, that the success of the present invention does not necessarily depend upon having a laminated structure but for present purposes, especially in the manufacture of large wraps or bags, such a laminated structure is preferred. It will also be understood that more than two laminations can be utilized or, where expedient, merely a single web with the necessary amount of hot-melt adhesive applied. Furthermore, it will be appreciated that it is not necessary to laminate throughout the double web but, if desirable, the laminating can be confined marginally so that the blanks are spaced apart in duplex form.

As seen from Fig. 2 a blank 18 is folded over upon itself with the marginal applications of adhesive coming in face-to-face contact. After the blank is thus formed into bag and seam forming relationship, the marginal seam areas 19 are fused together preferably by the application of heat and pressure whereby the adhesive will then be dispersed as more fully illustrated in Fig. 4. This dispersion may be by pressure alone, if a pressure responsive adhesive is used as an alternative to the application of heat and pressure. It will be seen that the dispersion of such an adhesive will cause the same to penetrate between the seam areas, particularly in the pierced areas adjacent the various lamina, as indicated at 20. There is also provided a clinching effected on the outer surfaces of the adhesive or wax where an anchorage is provided. Furthermore, enveloping the numerous free tentacles or fibers of the material resulting from the piercing operation by such hot-melt adhesive, an additional anchorage is provided between adjacent lamina as well as throughout the seam structure. Where non-fibrous material is used in the formation of the inner ply, the tentacle-like anchorage between the adhesive or wax will, of course, be less. Where, however, the laminations consist of an outer paper layer the condition still obtains. Preferably, the inner layers, as above indicated, are of a grease-proof material, such as Cellophane, glassine, parchment, or the like, while the outer layers constitute the fibrous reinforcing webs which lend protection as well as rigidity and anchoring surfaces to the seam and seal construction.

Fig. 3 illustrates a bag similar in appearance to the bag shown in Fig. 2 except that two blanks of material, such as those illustrated in 18, have similarly been brought together with the adhesive faces in contact with each other and three sides of the marginal areas sealed as desired by heat, pressure, or both, to provide a similar type of bag.

It will be understood, of course, that the present invention is not limited in its application merely to bags or containers but contemplates all related seam structures wherever the sense permits. It is contemplated that any suitable type of bag or other article can so be heat-sealed whether it be flat or envelope type, satchel, square or even gusset type bags made on machines running a continuous web instead of blanks. The invention resides in a reinforced seam and seal construction as indicated by the foregoing description and is intended to cover any seam construction wherever the same is applicable.

It will also be noted that the piercing or perforating operation is not necessarily limited to the time when the sheet is being manufactured. This can be done when the seam is being constructed.

It is important that the piercing operation be multitudinous and fine to provide a maximum anchorage area and sufficient thermoplastic or other suitable adhesive, preferably a slight excess thereof, so that an adequate surface anchorage can be obtained throughout the entire mass of the seam structure.

It will thus be seen that the objects hereinbefore set forth may readily and efficiently be obtained and since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of making bags comprising applying a coating of heat-sealing adhesive to a web of fibrous material, marginally piercing said web to provide multitudinous openings therein without removing any material therefrom in a manner to disrupt and fringe said web and to expose numerous fibrous tentacles throughout each of said openings, cutting said web into bag lengths, superimposing lengths of said treated web upon each other, and heat and pressure sealing marginal portions of said pierced areas to disperse said adhesive throughout adjacently aligned openings in said web to cause the adhesive to bind together said fibrous tentacles and marginal portions of said web to provide a bag having a seam bound together by said fibrous sheet tentacles and adhesive only.

2. A bag comprising walls of fibrous sheet material each having applied thereto a coating of heat-sealing adhesive, and having marginally pierced areas in said walls providing openings therein without any of the web material being removed therefrom to provide exposed numerous fibrous tentacles in said openings, said marginal portions being heat-sealed in face-to-face relationship, and said adhesive binding together said tentacles and extending throughout adjacently aligned openings and between marginal face-to-face portions of said bag, said marginal portions providing a fused homogeneous mass constituting a seam formed by the marginally applied adhesive and the tentacles of said fibrous sheet within said pierced openings being interlocked together by means of said adhesive only.

CHARLES A. SOUTHWICK, Jr.